Nov. 18, 1941.   B. HAYDEN   2,262,802
METHOD OF FORMING END FITTINGS ON WIRES
Filed Aug. 2, 1940

Inventor
Boyd Hayden
by Wright, Brown, Quinby May
Attys.

Patented Nov. 18, 1941

2,262,802

UNITED STATES PATENT OFFICE 2,262,802

METHOD OF FORMING END FITTINGS ON WIRES

Boyd Hayden, Newton, Mass.

Application August 2, 1940, Serial No. 349,803

5 Claims. (Cl. 29—148.5)

This application is a continuation-in-part of my copending application Ser. No. 272,467, filed May 8, 1939, for "End fitting for wire," now Patent 2,244,696, granted Oct. 6, 1940.

It is an object of the present invention to provide an improved method of making end fittings such as are illustrated and described in by said application. While such end fittings can be described in various ways, the invention is more particularly directed to a method for making end fittings which are to be subjected to hard usage when in service, as, for example, dobby cords for looms. According to the invention, an anchoring element is formed on the end of a stranded wire such as the core of a wire-cored dobby cord. This is done in a rapid and economical manner without reducing the breaking strength of the wire core. After the anchoring element has been formed on the end portion of the stranded wire, an end fitting is secured thereto, this end fitting being preferably made from a piece of sheet metal suitably formed with an open end. The anchoring element is inserted in the open end and the end fitting is then pressed to form a constriction against the end of the anchoring element remote from the end of the stranded wire. Thus the constriction and the anchoring element interlock to secure the end fitting positively on the end of the wire.

For a more complete understanding of the invention, reference may be had to the following description thereof, and to the drawing of which Figure 1 is an elevational view of an end portion of a wire-cored dobby cord with stripped end.

Figure 1:
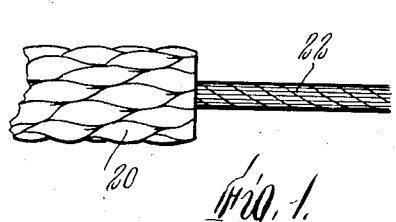
Figure 2:
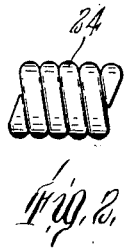
Figure 2 is an elevational view of a helical coil of wire used to form an anchoring element.
Figure 3:
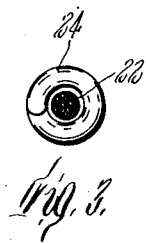
Figure 3 is an end view of a stranded wire having a coil loosely fitted thereon.
Figure 4:
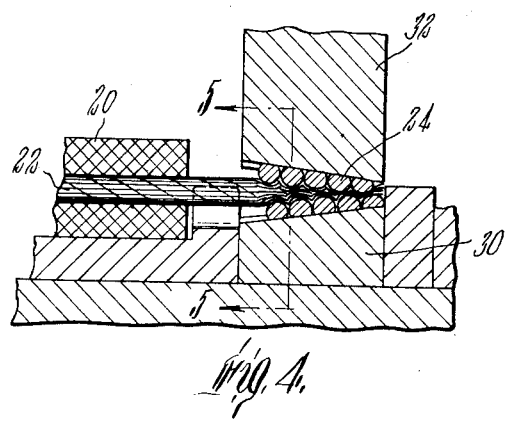
Figure 4 is a sectional view of apparatus pressing the coil on the end portion of a stranded wire.
Figure 6:
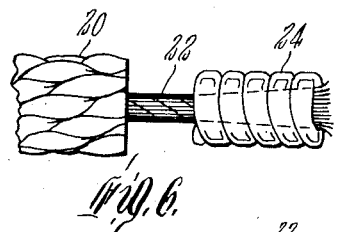
Figure 6 is an elevational view of a completed anchoring element on a stranded wire.
Figure 5:
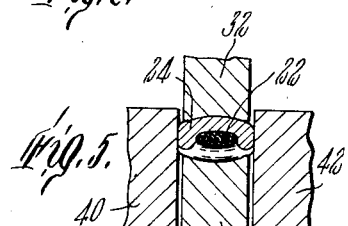
Figure 5 is a sectional view on the line 5—5 of Figure 4.
Figure 10:
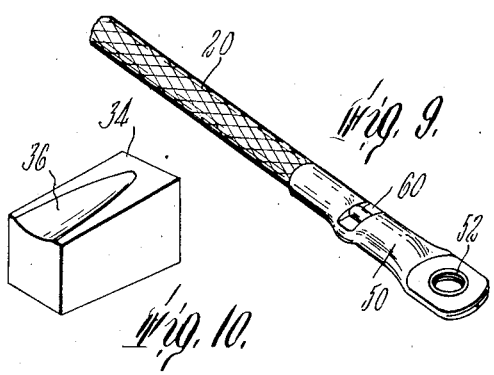
Figure 10 is a perspective view of one of the pressing elements shown in Figure 4.

In mounting an end fitting on the end of a wire-cored dobby cord, the end portion of the cord 20 is stripped of its braided cotton strands to expose a suitable length of the stranded wire core 22. Dobby cords customarily have an external diameter of approximately .250 inch, the diameter of the wire core being .067 inch. These measurements and others given hereinafter are by way of example only, the invention not being limited to these or any other specific measurements. In order to form an anchoring element securely on the end portion of the wire core 22, I form a helical coil 24 of soft steel wire or other suitable material, No. 16 wire being suitable for this purpose. The helix is made with a sufficient internal diameter to receive the wire core 22. Thus, for example, the internal diameter of the coil may be approximately .080 inch, this being of sufficient size to receive the core 22 easily. The coil 24 is slipped over the bared core 22 and is then subjected to pressure between two opposed surfaces which are preferably divergent so that the turns of the coil 24 are squeezed and deformed different amounts. For this purpose, a pair of jaws 30 and 32 may be suitably mounted in a machine having means (not shown) for pushing these jaws toward each other. Each of the jaws is made with a pressure face 34, these faces being preferably divergent as indicated in Figure 4. Each pressure face 34 may be plane or may be partly hollowed as at 36, the depression being of varying depth as indicated in Figure 10. The jaws 30 and 32 are pressed together with sufficient force to squeeze and flatten the coil 24, the maximum flattening coming at the end of the coil nearest to the end of the core 22. The other end of the coil 24 is subjected to little or no flattening so that the core 22 is not weakened at the point where it enters the coil 24. As a result of the flattening of the coil 24, the portion of the core 22 embraced thereby is likewise flattened and laterally spread as indicated in Figure 5. To prevent excessive spreading of the coil 24 such as would interfere with the mounting of an end fitting thereon, a pair of opposed abutment members 40 and 42 are provided, these members having parallel faces between which the jaws 30 and 32 operate. The portion of the core 22 which is embraced by the coil 24 is not only flattened when the coil is pressed but is also crimped or waved, the crimps being increasingly pronounced toward the end of the core. Thus the coil 24 grips the end portion of the core 22 securely, the maximum gripping effect being by the turns of the coil nearest to the end of the core.

There is relatively little deformation of the coil where the stranded wire enters it. Hence the full tensile strength of the stranded wire is preserved at that point and premature failure is avoided.

Figure 7:
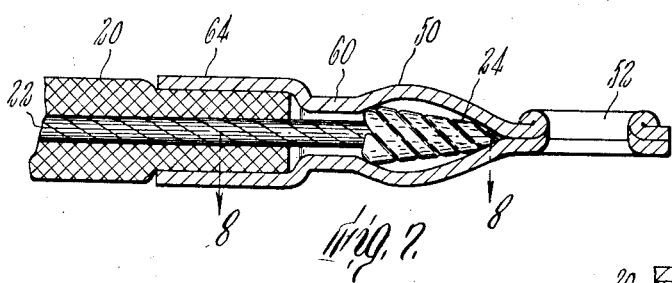
Figure 7 is a sectional view of an end portion of a dobby cord having a completed end fitting thereon.
Figure 8:
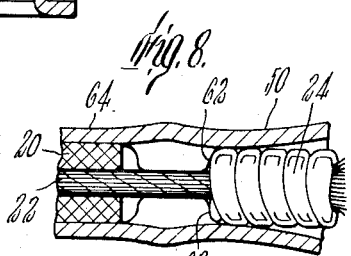
Figure 8 is a sectional view on the line 8—8 of Figure 7.
Figures 9, 11:
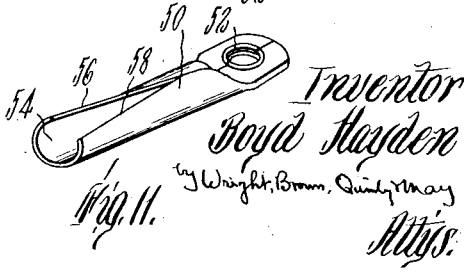
Figure 9 is a perspective view of an end portion of a dobby cord with a completed end fitting thereon.
Figure 11 is a perspective view of an end fitting prior to its attachment to the end of a dobby cord.

After the coil 24 has been properly presented by the jaws 30 and 32 to secure the coil firmly on the end portion of the core 22 so as to form an anchoring element thereon, an end fitting 50 may then be mounted on the cord. As shown in Figure 11, such end fitting may be made from a piece of sheet metal of suitable stiffness, a portion being folded upon itself and shaped to form an eye 52 or some other device, leaving an open end 54 into which the anchor element on a dobby cord may be inserted. After such insertion, the end fitting is then pressed to bring the edges 56 and 58 together and to form a constriction 60 as illustrated in Figures 7 and 9. This constriction results in interior shoulders 62 which engage against the end of the anchoring element remote from the extreme end of the wire core 22. Thus the constriction 60 positively interlocks with the anchoring element to secure the fitting 50 on the end of the dobby cord. The fitting 50 is preferably of sufficient length to include a portion 64 adapted to fit tightly about a portion of the woven fiber covering of the core adjacent to the bared end.

It is evident that various modifications and changes may be made in the embodiment of the invention herein shown and described without departing from the spirit or scope thereof as defined in the following claims.

I claim:

1. The method of making an anchoring element on a stranded wire, which comprises placing a short helical coil of wire on said stranded wire, and pressing said coil between two opposed surfaces in such a manner as to flatten some of the turns of said coil and to flatten and crimp the portion of said stranded wire embraced by said turns to a wavy form.

2. The method of making an anchoring element on a stranded wire, which comprises placing a short helical coil of wire on said stranded wire, and pressing said coil between two opposed divergent surfaces in such a manner as to flatten certain of the turns of said coil in progressively increasing degrees, the maximum flattening occuring in the turn nearest to the adjacent end of the stranded wire.

3. The method of making an anchoring element on a stranded wire, which comprises making a short helix of soft steel wire adapted to fit loosely on said stranded wire, slipping said helix on an end portion of said stranded wire, and pressing said helix between two divergent surfaces in a manner to flatten the turns of the helix in progressively increasing degrees and to flatten and crimp the portion of the stranded wire embraced by said helix, the maximum flattening being at the end of the helix nearest to the adjacent end of the stranded wire.

4. The method of making an anchoring element on a stranded wire, which comprises placing on said stranded wire a short helix of malleable wire of substantial stiffness, confining said helix between opposed parallel surfaces to prevent excessive spreading, and pressing said helix between two opposed divergent surfaces to flatten the turns of the helix and to flatten and crimp the portion of the wire embraced thereby, said flattening varying from a minimum at the end of the helix remote from the end of the stranded wire to a maximum at the end of the helix adjacent to said end.

5. The method of making an end fitting on a stranded wire, which comprises fitting a helical coil of wire on the end portion of said stranded wire, pressing said coil between opposed divergent surfaces to flatten said coil and to flatten and crimp the portion of the stranded wire embraced thereby, thereby forming an anchoring element on said stranded wire, shaping a piece of sheet metal into an end fitting with an open end, inserting said anchoring element into the open end of said fitting, and pressing said fitting near said open end to make a constriction therein against the end of said anchoring element remote from the end of the stranded wire.

BOYD HAYDEN.